US012575574B2

(12) United States Patent
Ryu et al.

(10) Patent No.: US 12,575,574 B2
(45) Date of Patent: Mar. 17, 2026

(54) COMPOSITION FOR CONTROLLING PLANT DISEASE AND INSECT AND METHOD FOR PREPARING SAME

(71) Applicant: KOREA RESEARCH INSTITUTE OF BIOSCIENCE AND BIOTECHNOLOGY, Daejeon (KR)

(72) Inventors: Choong Min Ryu, Daejeon (KR); Sang Moo Lee, Daejeon (KR)

(73) Assignee: KOREA RESEARCH INSTITUTE OF BIOSCIENCE AND BIOTECHNOLOGY, Daejeon (KR)

( * ) Notice: Subject to any disclaimer, the term of this patent is extended or adjusted under 35 U.S.C. 154(b) by 306 days.

(21) Appl. No.: 18/180,321

(22) Filed: Mar. 8, 2023

(65) Prior Publication Data

US 2023/0292763 A1 Sep. 21, 2023

Related U.S. Application Data

(63) Continuation-in-part of application No. PCT/KR2021/012187, filed on Sep. 8, 2021.

(30) Foreign Application Priority Data

Sep. 8, 2020 (KR) ........................ 10-2020-0114907
Sep. 8, 2021 (KR) ........................ 10-2021-0119490

(51) Int. Cl.
| | |
|---|---|
| *A01N 63/20* | (2020.01) |
| *A01N 63/22* | (2020.01) |
| *A01P 1/00* | (2006.01) |
| *A01P 7/04* | (2006.01) |

(52) U.S. Cl.
CPC ............ *A01N 63/20* (2020.01); *A01N 63/22* (2020.01); *A01P 1/00* (2021.08); *A01P 7/04* (2021.08)

(58) Field of Classification Search
None
See application file for complete search history.

(56) References Cited

U.S. PATENT DOCUMENTS

2020/0245627 A1 8/2020 Wigley et al.

FOREIGN PATENT DOCUMENTS

| | | |
|---|---|---|
| CN | 103053621 A | 4/2013 |
| CN | 105385643 A | 3/2016 |
| KR | 10-1188641 B1 | 10/2012 |
| KR | 10-2126582 B1 | 6/2020 |
| WO | 2017127535 A1 | 7/2017 |

OTHER PUBLICATIONS

Meena et al., "Plant growth promoting traits shown by bacteria Brevibacterium frigrotolerans SMA23 Isolated from Aloe vera rhizosphere"; Agric. Sci. Digest., vol. 37, No. 3, pp. 226-231, Sep. 2017.

Zhang et al., "Analysis of the complete genome sequence of Brevibacterium frigoritolerans 28201705 isolated from drought-and salt-stressed rhizosphere soil of maize" Annals of Microbiology, vol. 69, pp. 1489-1496 (2019).

Kim et al., "Characterization of Bacillus luciferensis Strain KJ2C12 from Pepper Root, a Biocontrol Agent of Phytophthora Blight of Pepper"; Plant Pathol. J, vol. 25, No. 1, pp. 62-69 (2009).

Kisiel, "Biological Control as an Alternative Method of Protecting Crops Against Fungal Pathogens"; Rocznik Ochrona Środowiska (Annual Set The Environment Protection); vol. 21, pp. 1366-1377 (2019).

Nagel et al., "Bacillus niacini sp. nov., a Nicotinate-Metabolizing Mesophile Isolated from Soil"; International Journal of Systematic Bacteriology, vol. 41, No. 1, pp. 134-139, Jan. 1991.

Markande et al., Characterization of Solibacillus silvestris strain AMI that produces amyloid bioemulsifier; Journal of Basic Micro-biology, vol. 58, pp. 523-531 (2018).

Extended Search Report for European Application No. 21867107.1 dated May 6, 2024, pp. 1-15.

Zheng, X. et al., "Selection and identification of biological control *Bacillus* strains against plant bacterial wilt disease", Chinese Journal of Biological Control, 2016, vol. 32, No. 5, p. 657-665. English abstract included.

Nishijima, T. et al., "Predominant Culturable *Bacillus* Species in Japanese Arable Soils and Their Potential as Biocontrol Agents", Microbes and Environments, 2005, vol. 20, No. 1, p. 61-68.

Batool, R. et al., "Biocontrol potential of *Bacillus gibsonii* and *Brevibacterium frigoritolerans* in suppression of Fusarium stalk rot of maize: a sustainable approach", Asian Journal of Agriculture and Biology, 2019, vol. 7, No. 3, 6.320-333.

Lee, Sang-Moo et al., "Disruption of Firmicutes and Actinobacteria abundance in tomato rhizosphere causes the incidence of bacterial wilt disease", The ISME Journal, 2021, vol. 15, p. 330-347.

International Search Report issued in Patent Application No. PCT/KR2021/012187 dated Dec. 21, 2021.

*Primary Examiner* — Oluwatosin A Ogunbiyi
(74) *Attorney, Agent, or Firm* — Sughrue Mion, PLLC

(57) ABSTRACT

The present invention relates to four types of Gram-positive bacteria (*Brevibacterium frigoritolerans* (HRS1, KCTC 14301BP), *Bacillus niacini* (HRS2, KCTC 14302BP), *Solibacillus silvestris* (HRS3, KCTC 14303BP), and *Bacillus luciferensis* (HRS4, KCTC 14304BP) strains), which increase resistance of plants against plant pathogens and to a composition of a biocontrol agent by using same and, more specifically, to a microbial fertilizer having a control effect against microbial diseases such as bacterial wilt occurring in crops (tomatoes, peppers, etc.), and against pests such as aphids by using the strains alone or a mixture thereof.

8 Claims, 8 Drawing Sheets

Specification includes a Sequence Listing.

```
                          SEQUENCE LISTING

Sequence total quantity: 2
SEQ ID NO: 1            moltype = DNA  length = 20
FEATURE                 Location/Qualifiers
source                  1..20
                        mol_type = other DNA
                        organism = synthetic construct
SEQUENCE: 1
agagtttgat cctggctcag                                         20

SEQ ID NO: 2            moltype = DNA  length = 19
FEATURE                 Location/Qualifiers
source                  1..19
                        mol_type = other DNA
                        organism = synthetic construct
SEQUENCE: 2
ggttaccttg ttacgactt                                          19
```

COMPOSITION FOR CONTROLLING PLANT DISEASE AND INSECT AND METHOD FOR PREPARING SAME

TECHNICAL FIELD

The present disclosure relates to a composition for controlling plant disease and insect and a method for preparing the same.

BACKGROUND ART

Bacterial wilt is a disease with rapid wilting (withering) symptoms and is caused by the plant pathogenic bacterium *Ralstonia solanacearum*. Bacterial wilt is a globally distributed soil disease that infects more than 200 plant species, including major solanaceous crops such as tomatoes, potatoes, peppers, eggplants, and tobacco, to thereby cause serious economic losses in agricultural and horticultural production. At first, leaves near growing points wilt, and recover for several days at night and on rainy days, and then the whole leaves wilt, so the entire plant cannot recover and be dried. It may be seen that, when a stem is cut or an epidermis is cut, a vascular tube is browned, and when the stem is cut and floated in water, white bacterial liquid (ooze) flows out. Bacterial wilt occurs more severely under a high-temperature and high-humidity environment with an increased incidence and appears frequently in facility cultivation such as greenhouses. Once bacterial wilt occurs, it is highly contagious by contact, so all diseased plants should be removed and the temperature and humidity should be lowered. However, it is very difficult to put this into practice in farms.

In order to prevent the occurrence of bacterial wilt, as a bacterial wilt control method a cultural method such as crop rotation, intercrop cropping, cultivation and packaging hygiene and a method of cultivating resistant varieties have been mainly applied. It is known that the use of copper (copper hydroxide) and agricultural antibiotics (streptomycin, oxytetracycline, validamycin, etc.) is somewhat effective, but other chemical control measures are very limited due to side effects such as appearance of antibiotic resistance strains. Recently, biopesticides that are effective in controlling bacterial wilt have been developed and patented or released as products and are being supplied to farmers. Most of the biopesticides use microorganisms such as bacteria genus *Pseudomonas, Burkholderia, Bacillus, Lysinibacillus, Paenibacillus*, and *Brevibacillus*, and a fungal species *Trichoderma*. As the biopesticides, products such as probiotic charcoal (Farm Hannong Co., Ltd.), Heukhyang (BIG. Co., Ltd.), Cheongotan (BIG. Co., Ltd.), Pangi Coma (Nambo Co., Ltd.), and KomaH (Nambo Co., Ltd.) are being released and sold in the market in Korea. Microbial biopesticides are considered environmentally friendly control measures compared to synthetic pesticides having a wide control spectrum because the microbial bio-pesticides do not affect other than target organisms, but cannot cope with all species present in the population of target pathogens in actual packaging.

Rhizosphere microbiota play an important role in rigidity, growth, and immunity of plants. The positive and negative effects of single crop cultivation systems on soil microbes have been studied for a long time. Generally, a phenomenon known as negative plant-soil feedback changes the soil environment to a disease-prone condition. On the other hand, after persistent and serious occurrence of the disease due to continuous single crop cultivation, the progress of the soil disease may be suppressed. In such soil, despite the presence of the disease, plant hosts simultaneously exhibit resistance to the disease and the occurrence of the disease may be minimized. Disease-suppressive soils are mainly known to be effective against pathogens such as *Rhizoctonia solani* (rice sheath blight), *Pythium ultimum* (damp-off disease), *Gaeumannomyces graminis* var *tritici* (take-all), *Plasmodiophora brassicae* (root gall disease), and *Fusarium oxysporum (fusarium* wilt disease) which are soil-derived fungal diseases, and *Ralstonia solanacearum* (bacterial wilt) which is a bacterial disease.

Control of plant diseases is mainly undertaken with chemical pesticides, but concerns about the use thereof are increasing for reasons such as acquisition of resistance against drugs by pathogenic microorganisms, residual toxicity of chemical pesticides, toxicity to humans and animals, and destruction of ecosystems. Accordingly, the development and use of microbial agents as a substitute for the chemical pesticides are increasing.

As a patent for a previously registered microbial agent, Korean Patent Publication No. 10-1188641 discloses that a microbial fertilizer including *Bacillus subtilis* (GDYA-1) or a culture solution or mixture thereof as an active ingredient has antibacterial activity against plant pathogens such as white leaf blight, blast disease, kidney disease, rice kernel blight, sesame seed blotch, and sheath blight, and Korean Patent Publication No. 10-2126582 discloses that a microbial fertilizer simultaneously controls *Isaria javanica* FT333 strains (*Isaria javanica* FT333) or *thrips* and plant anthracnose using the same.

It has been reported that compositions of rhizosphere microorganisms in soils that suppress and cause disease in plants differ, and the imbalance (dysbiosis) of microorganisms living in rhizosphere of soils makes a difference in the incidence of disease. Studies on the microflora of *Arabidopsis thaliana* leaves have reported that an increase in Proteobacteria, an antagonistic microorganism, decreases Firmicute of leaf, resulting in a microbial imbalance and disease symptoms. This study provides a clue that the addition of specific beneficial bacteria alone or a mixture thereof may reverse microbial imbalance even in the soil, which has been unbalanced due to the prevalence of pathogens, and induce plants to grow healthily.

BRIEF SUMMARY

Technical Problem

The present disclosure provides *Brevibacterium frigoritolerans* HRS1 (KCTC 14301BP), *Bacillus niacini* HRS2 (KCTC 14302BP), *Solibacillus silvestris* HRS3 (KCTC 14303BP) or *Bacillus luciferensis* (HRS4, KCTC 14304BP) strains capable of eliciting immunity (resistance) of plants against plant pathogens and a control effect against insects.

The present disclosure provides a composition for controlling plant diseases and insects including any one selected from the group consisting of one or more of the strains, spores of the strains, a culture solution of the strains, and an extract of the culture solution as an active ingredient.

The present disclosure provides a method for controlling plant diseases and insects in which, in a treatment operation, compositions are treated on soil, treated on roots, treated on seeds, sprayed onto plants, or treated by a combination thereof.

The present disclosure provides a method for preparing a composition for controlling plant diseases and insects including cultivating one or more of *Brevibacterium frigo-*

*ritolerans* HRS1 (KCTC 14301BP), *Bacillus niacini* HRS2 (KCTC 14302BP), *Solibacillus silvestris* HRS3 (KCTC 14303BP) and *Bacillus luciferensis* (HRS4, KCTC 14304BP) strains capable of improving immunity (resistance) of plants against plant pathogens.

The present disclosure provides a use of one or more *Brevibacterium frigoritolerans* HRS1 (KCTC 14301BP), *Bacillus niacini* HRS2 (KCTC 14302BP), *Solibacillus silvestris* HRS3 (KCTC 14303BP), and *Bacillus luciferensis* HRS4 (KCTC 14304BP) strains for preparing a composition for controlling plant diseases and insects.

Technical Solution

One aspect of the present disclosure provides *Brevibacterium frigoritolerans* HRS1 (KCTC 14301BP), *Bacillus niacini* HRS2 (KCTC 14302BP), *Solibacillus silvestris* HRS3 (KCTC 14303BP), or *Bacillus luciferensis* HRS4 (KCTC 14304BP) strains capable of improving resistance of plants against plant pathogens and a control effect against insects.

In one embodiment of the present disclosure, the plant pathogen may be one or more of *Ralstonia solanacearum* and *Xanthomonas axonopodis* pv. *vesicatoria* (Xav).

Another aspect of the present disclosure provides a composition for controlling plant diseases and insects including one or more of *Brevibacterium frigoritolerans* HRS1 (KCTC 14301BP), *Bacillus niacini* HRS2 (KCTC 14302BP), *Solibacillus silvestris* HRS3 (KCTC 14303BP), and *Bacillus luciferensis* HRS4 (KCTC 14304BP) strains and as an active ingredient one or more selected from the group consisting of a spore of the strain, a culture solution of the strain, and an extract of the culture solution.

In one embodiment of the present disclosure, the plant disease may be any one of bacterial wilt on root and spot diseases on leaf.

In one embodiment of the present disclosure, the insect may be an aphid.

Another aspect of the present disclosure provides a method for controlling plant diseases and insects including treating the composition for controlling plant diseases and insects in a plant or around the plant.

In one embodiment of the present disclosure, in the treating, the composition may be treated on soil, roots, and, seeds, sprayed onto plants, or treated by a combination thereof.

Advantageous Effect

According to the present disclosure, the microbial preparation for plant disease control including *Brevibacterium frigoritolerans* HRS1 (KCTC 14301BP), *Bacillus niacini* HRS2 (KCTC 14302BP), *Solibacillus silvestris* HRS3 (KCTC 14303BP), and *Bacillus luciferensis* HRS4 (KCTC 14304BP) strains may show excellent effects on bacterial wilt control on tomato and aphid control on pepper through each strain or strain combination.

BRIEF DESCRIPTION OF DRAWINGS

FIG. 8A and FIG. 8B are diagrams illustrating an increase in yield of red pepper fruits by single microorganism and synthetic microorganism community (Syncom) treatments, in which FIG. 8A illustrates number of fruits per plant and FIG. 8B illustrates fruit weight per plant (kg).

DETAILED DESCRIPTION

Best Mode

Figure 1:
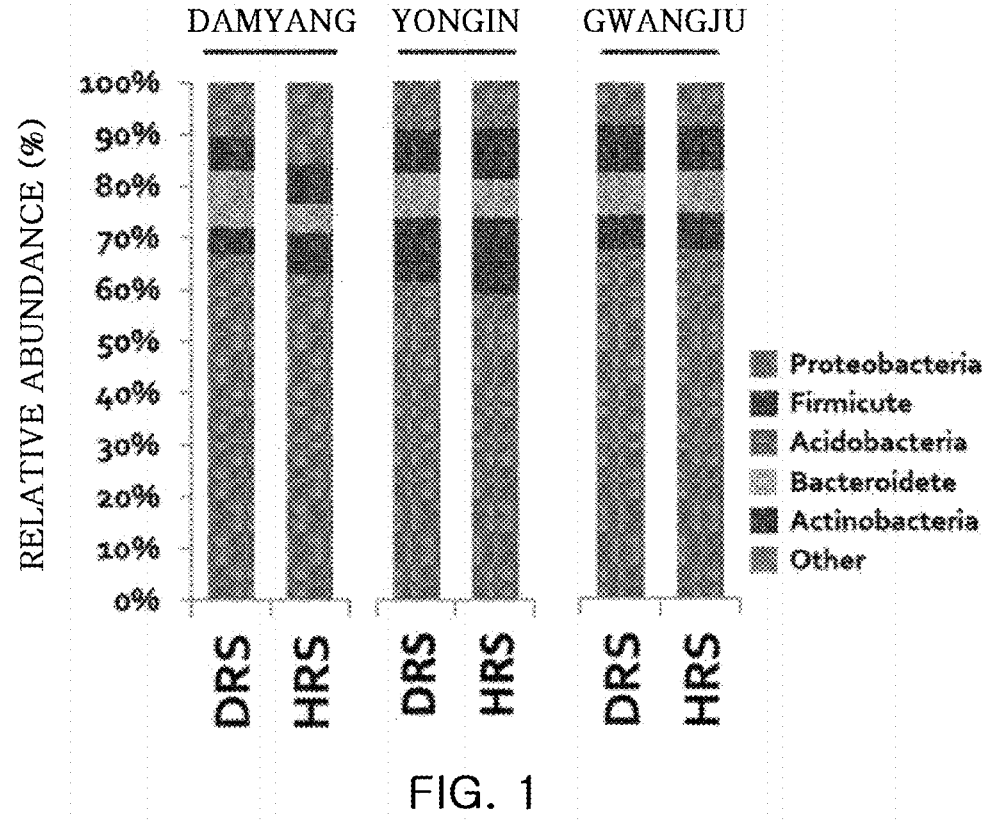
FIG. 1 is a diagram illustrating microorganisms in soil collected as a result of 16S rRNA analysis at a phylum level. Healthy rhizosphere soil (HRS), diseased rhizosphere soil (DRS).

One aspect of the present disclosure provides *Brevibacterium frigoritolerans* HRS1 (KCTC 14301BP), *Bacillus niacini* HRS2 (KCTC 14302BP), *Solibacillus silvestris* HRS3 (KCTC 14303BP), or *Bacillus luciferensis* HRS4 (KCTC 14304BP) strains capable of improving resistance of plants against plant pathogens and a control effect against insects.

In one embodiment of the present disclosure, the plant pathogen may be one or more of *Ralstonia solanacearum* and *Xanthomonas axonopodis* pv. *vesicatoria* (Xav). The plant pathogens are bacteria that cause bacterial wilt on tomato root system and spot diseases on pepper leaves. According to the present disclosure, *Brevibacterium frigoritolerans* HRS1 (KCTC 14301BP), *Bacillus niacini* HRS2 (KCTC 14302BP), *Solibacillus silvestris* HRS3 (KCTC 14303BP), or *Bacillus luciferensis* HRS4 (KCTC 14304BP) strains may, individually or in combination, improve resistance to one or more plant pathogens of *Ralstonia solan-*

*acearum* and *Xanthomonas axonopodis* pv. *vesicatoria* (Xav), and express a control effect against insects such as an aphid.

Another aspect of the present disclosure provides a composition for controlling plant diseases and insects including any one selected from the group consisting of one or more of the strains, spores or vegetative cells of the strains, a culture solution of the strains, and an extract of the culture solution as an active ingredient.

The culture solution of the strains may include both a culture solution including the strains and a culture solution obtained by filtering the strains broth culture. In addition, the composition may include a carrier other than the strains themselves, the culture solution of the strains, and the extract of the culture solution, and as the preferred carrier, water, white carbon, kaolin, dextrin, and the like may be used.

The extract of the culture solution may be preferably an extract obtained by extracting a culture solution of strains with an appropriate extraction solvent, for example, ethyl acetate, butanol, water, or a mixture thereof, and more preferably an ethyl acetate layer or a butanol layer remaining after fractionating a culture supernatant with the equal amounts of ethyl acetate or butanol, or an aqueous solution layer remaining after fractionating the culture supernatant with the equal amounts of ethyl acetate and butanol.

After mixing the spores or vegetative cells of the strains, the culture solution of the strains, or the extract of the culture solution with the carrier, it may be formulated into powder, pellets, granules, supernatant, or solutions and used.

In one embodiment of the present disclosure, the plant disease may be any one of bacterial wilt and spot disease, and more specifically, any one of tomato bacterial wilt and pepper spot disease. Most specifically, the plant disease may be any one of tomato bacterial wilt caused by *Ralstonia solanacearum* and pepper spot disease caused by *Xanthomonas axonopodis* pv. *vesicatoria* (Xav).

In one embodiment of the present disclosure, the insect may be an insect belong to insecta Hemiptera, and may be an insect including an aphid.

Another aspect of the present disclosure provides a method for controlling plant diseases and insects including treating the composition at a plant or around the plant.

Plants to which the method for controlling plant diseases and insects of the present disclosure may be applied are not particularly limited, but may include tomato, pepper, and the like, for example.

As described above, the plant disease may be any one of bacterial wilt and spot disease, and more specifically, any one of tomato bacterial wilt and pepper spot disease. Most specifically, the plant disease may be any one of tomato bacterial wilt caused by *Ralstonia solanacearum* and pepper spot disease caused by *Xanthomonas axonopodis* pv. *vesicatoria* (Xav).

In one embodiment of the present disclosure, in the treating, the composition may be treated on soil, roots, seeds, sprayed onto plants, or treated by a combination thereof.

Another aspect of the present disclosure provides a method for preparing a composition for controlling plant disease including cultivating one or more of *Brevibacterium frigoritolerans* HRS1, KCTC 14301BP), *Bacillus niacini* (HRS2, KCTC 14302BP), *Solibacillus silvestris* (HRS3, KCTC 14303BP), or *Bacillus luciferensis* (HRS4, KCTC 14304BP) strains capable of improving resistance of plants against plant pathogens.

Another aspect of the present disclosure provides a use of one or more *Brevibacterium frigoritolerans* (HRS1, KCTC 14301BP), *Bacillus niacini* (HRS2, KCTC 14302BP), *Solibacillus silvestris* (HRS3, KCTC 14303BP), and *Bacillus luciferensis* (HRS4, KCTC 14304BP) strains for preparing a composition for controlling plant disease.

MODE FOR DISCLOSURE

Hereinafter, one or more specific examples will be described in more detail through examples. However, these examples are intended to illustrate one or more specific examples, and the scope of the present disclosure is not limited to these examples.

Figure 2:
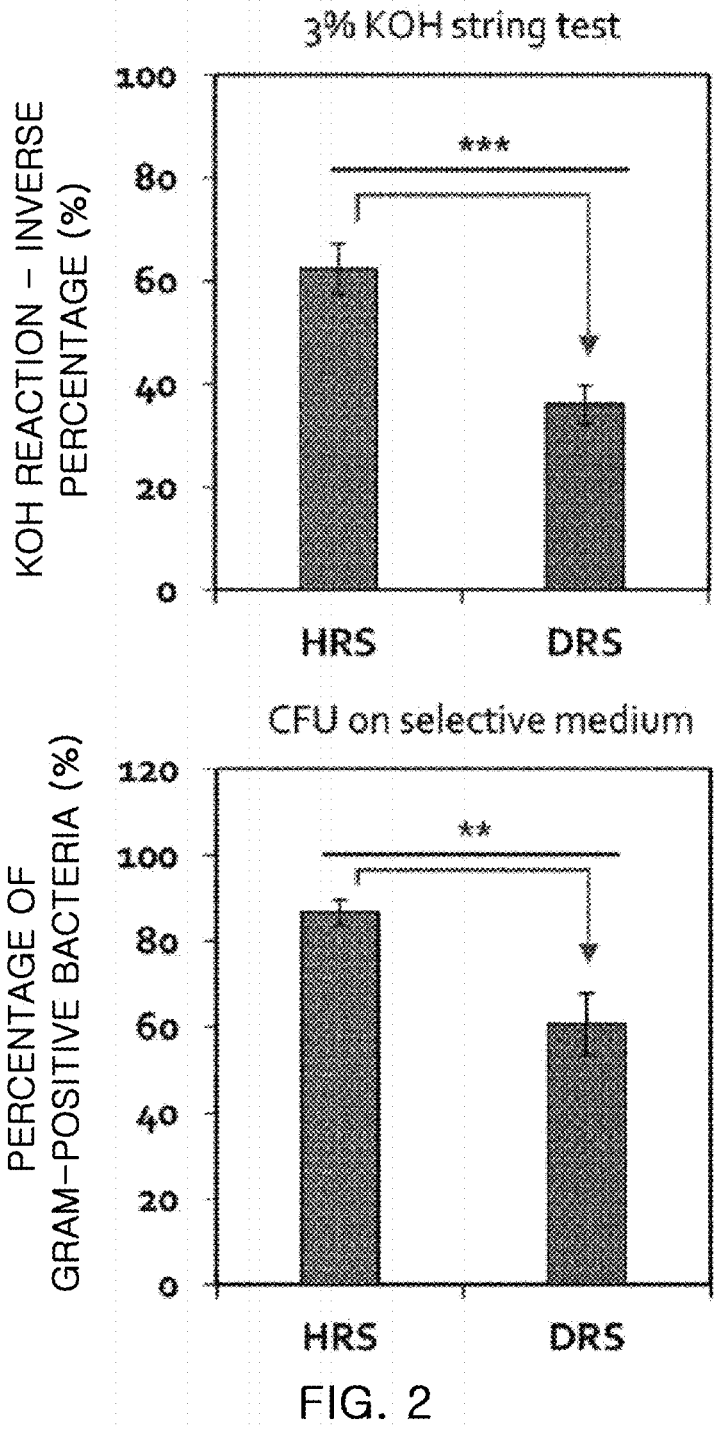
FIG. 2 is a diagram illustrating a percentage of Gram-positive bacteria in the healthy rhizosphere soil (HRS) and diseased rhizosphere soil (DRS) through a 3% KOH string test for simple assay to determine the Gram positive and negative bacteria and a selective medium.

Example 1: Comparison of Microbial Community of Healthy Soil without Tomato Bacterial Wilt and Soil with Tomato Bacterial Wilt Tomato bacterial wilt occurred locally (within 20 cm-1 m diameter) in tomato greenhouses located in Yongin, Gwangju, and Damyang, and the soil was collected and subjected to 16S rDNA sequence analysis to analyze microbial community of soil (healthy rhizosphere soil (HRS)) in which healthy tomatoes grow and soil (diseased rhizosphere soil (DRS)) in which tomatoes diseased with tomato bacterial wilt grow. Five phyla of Firmicutes, Actinobacteria, Acidobacteria, and Bacteroidetes, were found to constitute the major microbial phase (FIG. 1). Among them, the genes of microorganisms belonging to Firmicutes and Actinobacteria were found to be much more abundant in the soil (HRS) in which healthy tomatoes grow. To prove Firmicutes and Actinobacteria, they were cultured in selective medium including 20 µg/mL polymyxin B for selecting Gram positive bacteria or 5 µg/mL vancomycin for selecting Gram negative bacteria and 3% KOH string test was executed. The results of the two experiments showed that Firmicutes and Actinobacteria were present in the HRS in an amount of 26.2% and 26.3%, respectively (FIG. 2).

Figure 3:
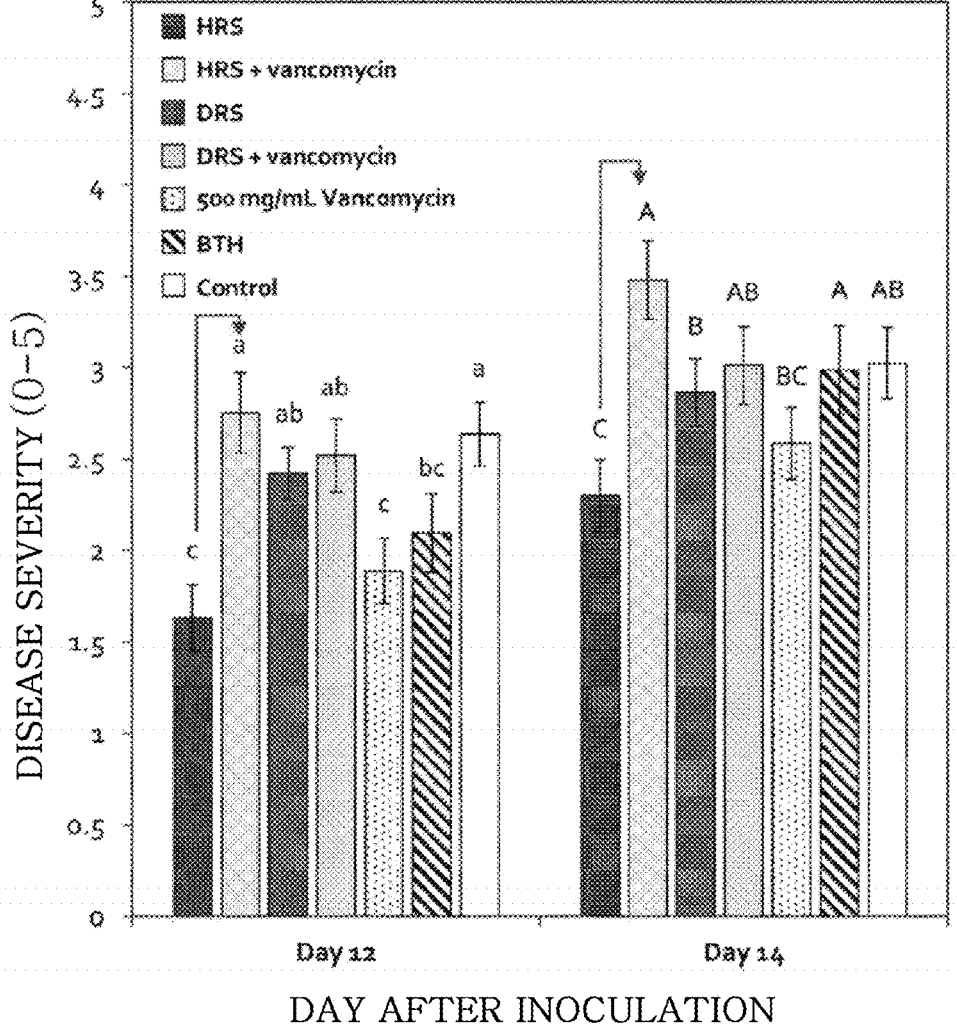
FIG. 3 is a diagram illustrating the occurrence amount of tomato bacterial wilt in the healthy rhizosphere soil (HRS) and diseased rhizosphere soil (DRS). It shows that treatment with vancomycin, an antibiotic that suppresses Gram-positive bacteria, increases the occurrence of tomato bacterial wilt of the HRS.

Example 2: Effect of Gram-Positive Bacteria on Occurrence of Tomato Bacterial Wilt in Healthy Soil where Tomato Bacterial Wilt does not Occur In order to examine the effect of Firmicutes and Actinobacteria confirmed in Example 1 on the occurrence of tomato bacterial wilt, symptoms of the tomato bacterial wilt were observed after suppressing Gram-positive bacteria in healthy soil. To this end, the incidence of the tomato bacterial wilt was observed in healthy soil and healthy soil treated with vancomycin which is an antibiotic specific to killing Gram-positive bacteria. It was found that, in soil where the Gram-positive bacteria were killed due to antibiotics, and thus, an imbalance in soil microorganisms has occurred, the symptoms of the tomato bacterial wilt increased 1.5 to 1.8 times as observed in FIG. 3.

Example 3: Isolation and Identification of Firmicutes and Actinobacteria in Healthy Soil without Tomato Bacterial Wilt To isolate bacteria that form endospores, IVIES buffer extracts of healthy soil without tomato bacterial wilt and soil with tomato bacterial wilt were cultivated at 80° C. for 30 minutes, spread on ⅒ TSA medium, and then cultivated at 30° C. for 48 hours. Among 326 heat resistant bacteria colonies, four types of Gram-positive bacteria sensitive to 500 µg/mL vancomycin were selected to isolate. 16S rRNA nucleotide sequence was analyzed using 27F/1492R primers, and comparative analysis using BLASTn found that these strains were *Brevibacterium frigoritolerans* FIRS 1, *Bacillus niacini* HRS2, *Solibacillus silvestris* HRS3, and *Bacillus luciferensis* HRS4.

TABLE 1

| Primer name | Primer sequence (5'->3')† |
|---|---|
| 27F | AGAGTTTGATCCTGGCTCAG (SEQ ID NO: 1) |
| 1492R | GGTTACCTTGTTACGACTT (SEQ ID NO: 2) |

The strains identified above were deposited on Sep. 8, 2020 at the Korean Collection for Type Cultures (KCTC) of the Korea Research Institute of Bioscience and Biotechnology. Specifically, *Brevibacterium frigoritolerans* HRS1 was deposited as KCTC 14301BP, *Bacillus niacini* HRS2 was deposited as KCTC 14302BP, *Solibacillus silvestris* HRS3 was deposited as KCTC 14303BP, and *Bacillus luciferensis* HRS4 was deposited as KCTC 14304BP.

Example 4: Tomato Bacterial Wilt Suppression Effect of *Brevibacterium frigoritolerans* HRS1, *Bacillus niacini* HRS2, *Solibacillus silvestris* HRS3, and *Bacillus luciferensis* HRS4 Single Treatment Group In order to examine the effect of 4 strains selected in Preparation Example 3 on induction of systemic resistance of plants, each of the 4 strains was treated on roots. At 5 days after root inoculation, *Ralstonia solanacearum*, bacterial disease, which is a tomato bacterial wilt-induced strain, stem-inoculated on tomato, by using a control in which roots are treated with same volume of sterile distilled water and BTH (benzo[1,2,3]thiadiazole-7-carbothioic acid S-methyl ester), a chemical that causes systemic resistance in plants, as a positive control, the incidence of disease was investigated.

Figure 4:
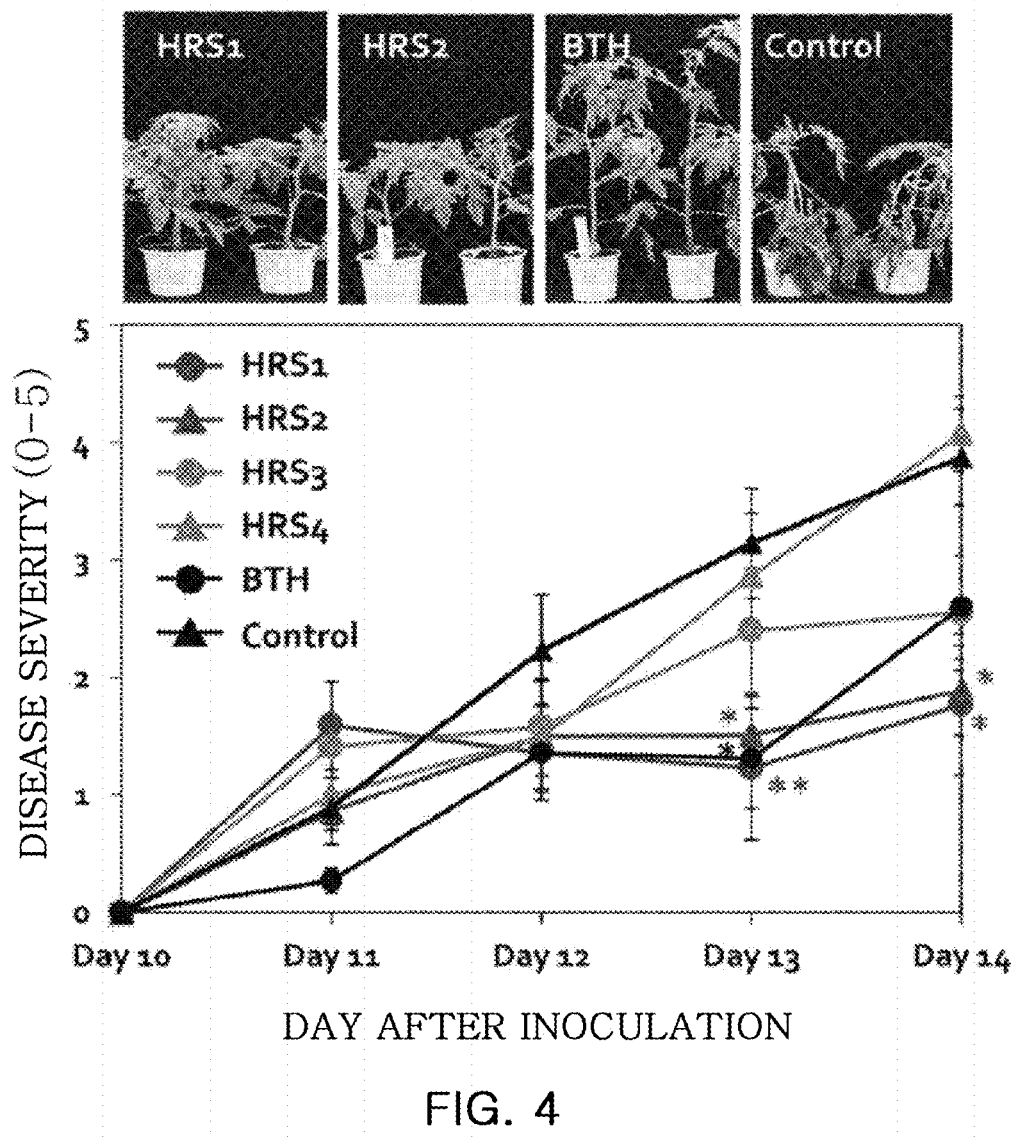
FIG. 4 is a diagram illustrating resistance against disease after treating bacterial wilt on soil in which tomato roots in which *Brevibacterium frigoritolerans* HRS1, *Bacillus niacini* HRS2, *Solibacillus silvestris* HRS3, and *Bacillus luciferensis* HRS4 strains, respectively, are treated are planted.

In the single treatment group, *Brevibacterium frigoritolerans* HRS1 and *Bacillus niacini* HRS2 showed resistance to bacterial wilt, as illustrated in FIG. 4 below.

Figures 5, 6:
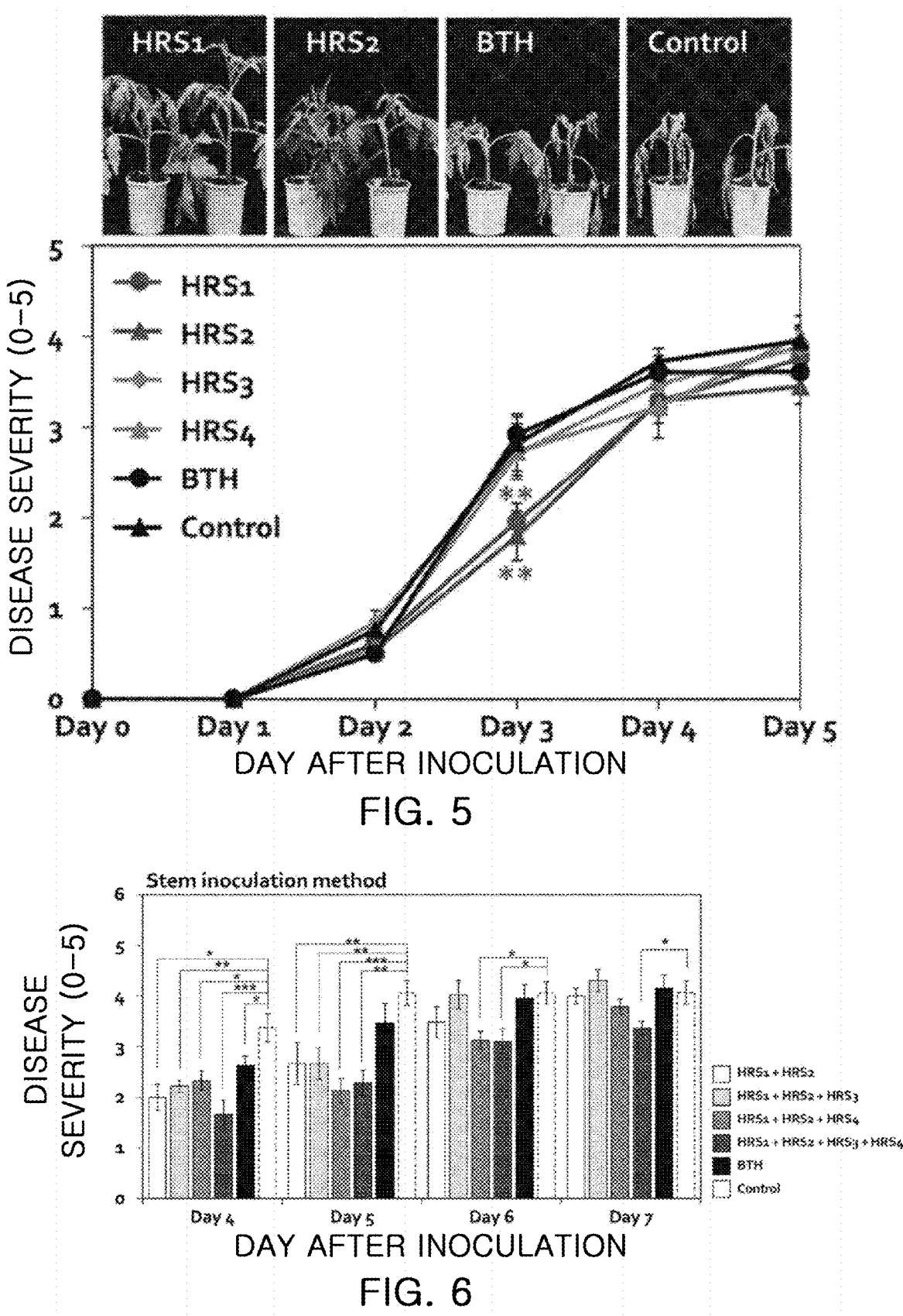
FIG. 5 is a diagram illustrating induced systemic resistance (plant systemic immunity) response of tomatoes after tomato stem inoculation of *Ralstonia solanacearum* following drench-inoculation of tomato roots with *Brevibacterium frigoritolerans* HRS1, *Bacillus niacini* HRS2), *Solibacillus silvestris* HRS3, and *Bacillus luciferensis* HRS4 strains, respectively.
FIG. 6 is a diagram illustrating results of the induced systemic resistance response by mixing *Brevibacterium frigoritolerans* HRS1, *Bacillus niacini* HRS2, *Solibacillus silvestris* HRS3, and *Bacillus luciferensis* HRS4 strains to produce synthetic microbial community (Syncom) and then treating the synthetic microbial community (Syncom) on tomatoes.

In order to find out whether the 4 strains selected in Preparation Example 3 cause induced resistance of tomatoes, 50 µL of tomato bacterial wilt strains were inoculated into stems after 7 days of treatment of each strain on roots to evaluate the induced resistance. As illustrated in FIG. 5 in the *Brevibacterium frigoritolerans* HRS1 and *Bacillus niacini* HRS2 treatment groups, the induced resistance was shown after 3 days of treatment of the tomato bacterial wilt. However, it was confirmed that the induced resistance by the treatment of each strain disappears on the 4th and 5th days after treating the tomato bacterial wilt.

To find out the effect of synthetic microbial community (Syncom) on the resistance of the tomato bacterial wilt rather than the single treatment group, *Brevibacterium frigoritolerans* HRS1, *Bacillus niacini* HRS2, *Solibacillus silvestris* HRS3, and *Bacillus luciferensis* HRS4 were mixed to treat a combination of two strains HRS1+HRS2, a combination of three strains HRS1+HRS2+HRS3 and HRS1+HRS2+HRS4, and a combination of four strains HRS1+HRS2+HRS3+HRS4 on the soil. Treatment of two strains increased the resistance of the tomato bacterial wilt from 3 days to 5 days when each strain was treated. When all four strains were mixed, the resistance was maintained for a long time, showing that the resistance was maintained up to 7 days, the end point of the experiment (FIG. 6).

Example 5: Expression of Induced Resistance-Related Genes by Synthetic Microbial Community (Syncom) Treatment In order to elucidate the mechanism of expression of the induced resistance by the synthetic microbial community (Syncom) treatment, the expression of plant defense-related genes was investigated.

Figure 7:
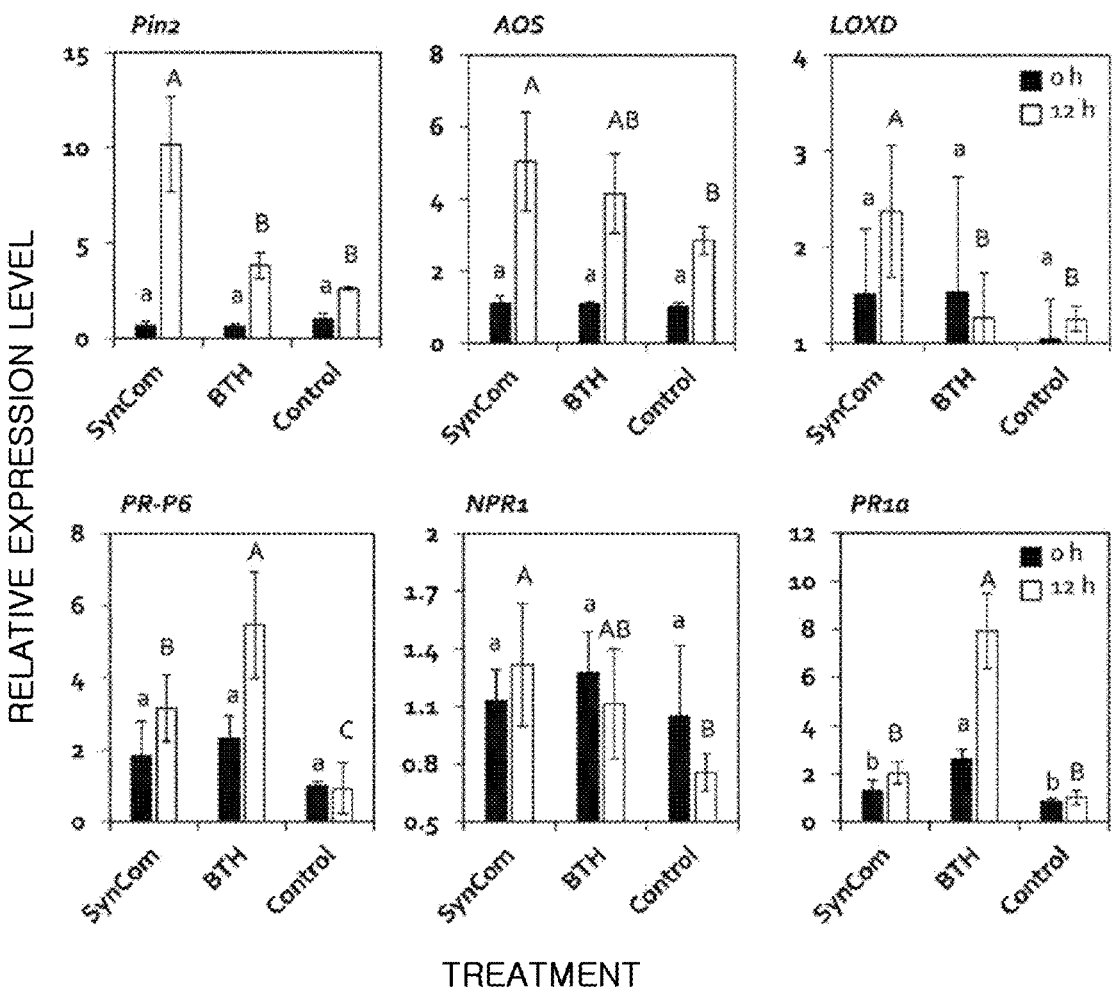
FIG. 7 is a diagram illustrating an expression of tomato genes related to induced resistance by synthetic microbial community (Syncom) treatment.

As can be seen in FIG. 7 below, it was confirmed that, after 12 days of the treatment of the tomato bacterial wilt, jasmonic acid signaling-related genes Pin2, AOS, and LoxD, and salicylic acid signaling-related genes PR-P6, NPR1, and PR1a increased, and thus, the synthetic microbial community (Syncom) treatment caused induced resistance dependent on the resistance signal pathway to jasmonic acid and salicylic acid, causing tomatoes to develop the resistance to the tomato bacterial wilt.

Figure 8A:
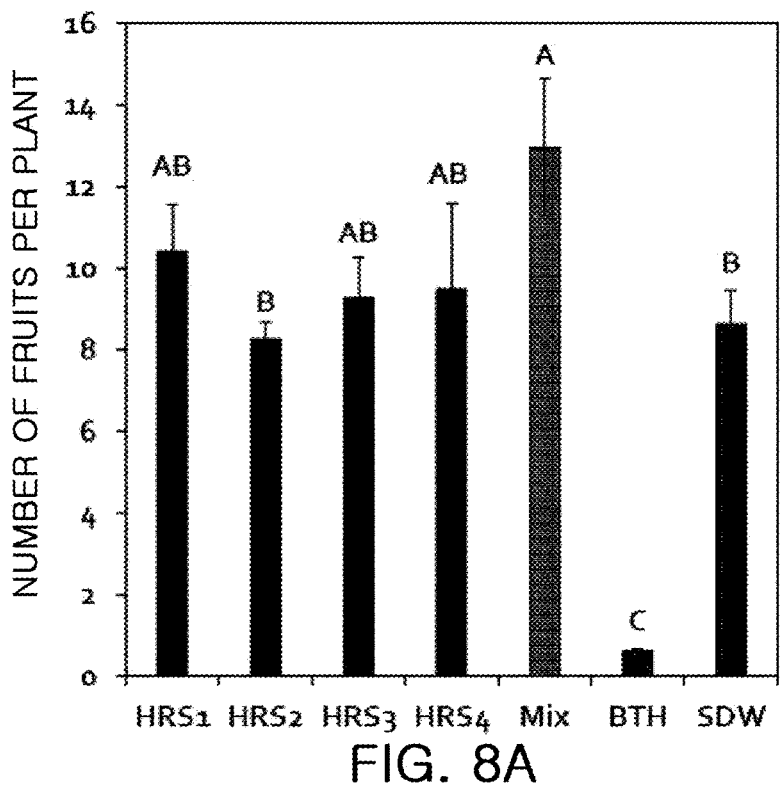
Figure 8B:
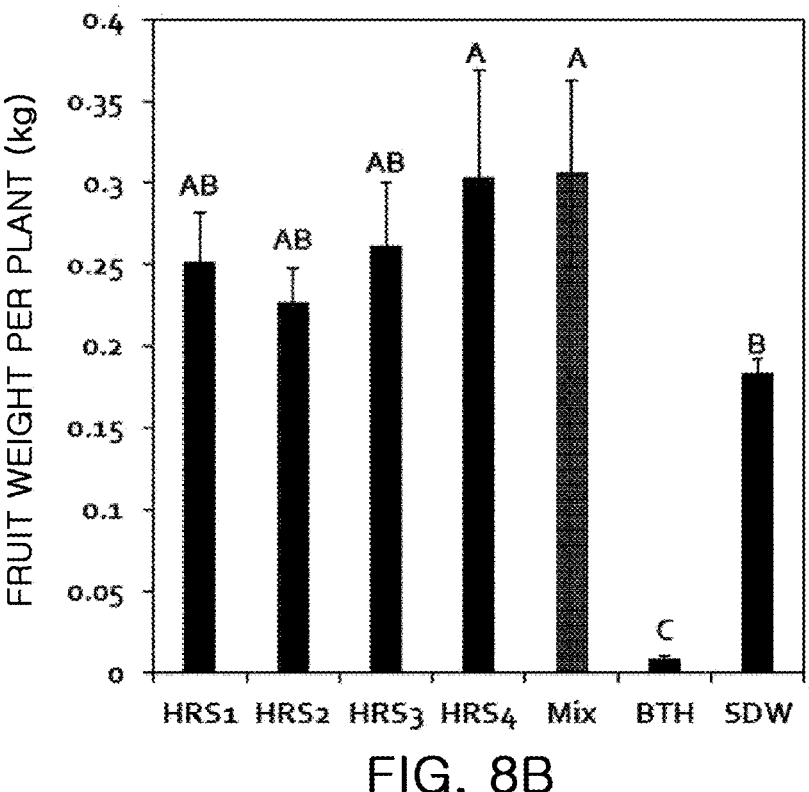

Example 6: Increased Pepper Yield by Single or Synthetic Microbial Community (Syncom) Treatment It was confirmed that the yield of red pepper increased or decreased by the single or synthetic microbial community (Syncom) treatment in the outdoor red pepper field. In the synthetic microbial phase, and it was confirmed that the number of peppers hanging per unit pepper seedling increased (FIG. 8A), and the weight per pepper drop also increased compared to the untreated group (FIG. 8B).

Figure 9:
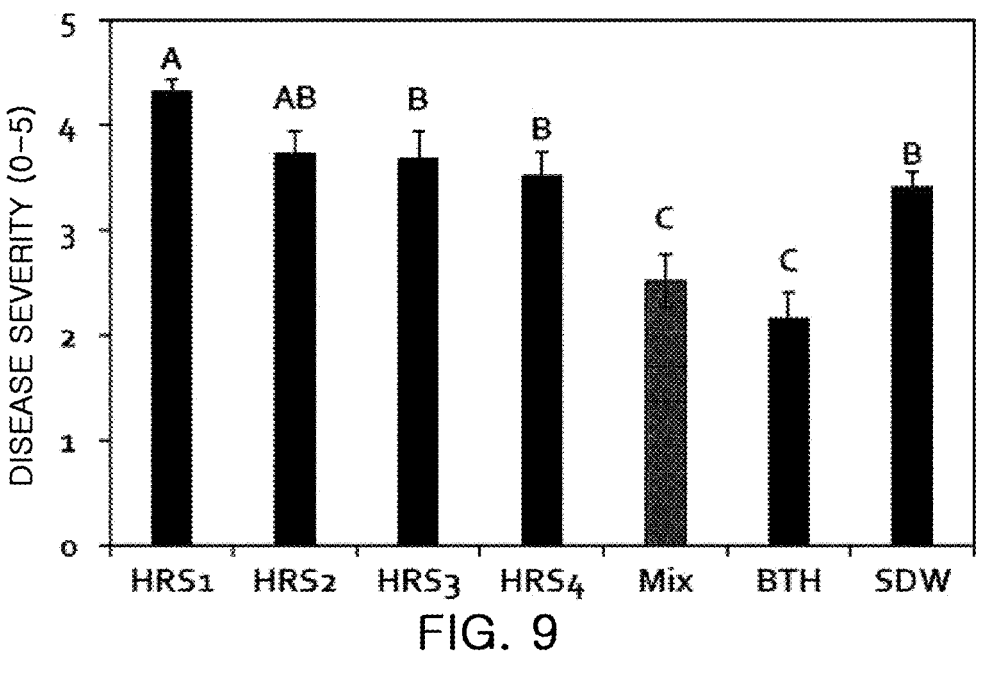
FIG. 9 is a diagram illustrating resistance to *Xanthomonas axonopodis* pv. *vesicatoria* (Xav), which causes bacterial spot disease of red pepper leaf with induced resistance caused by the synthetic microbial community (Syncom) treatment.

Example 7: Suppression of *Xanthomonas axonopodis* pv. *Vesicatoria* (Xav) Causing Bacterial Spot Disease of Pepper Leaves Through Single or Synthetic Microbial Community (Syncom) Treatment As a result of treating *Xanthomonas axonopodis* pv. *vesicatoria* (Xav), which causes the bacterial spot disease in peppers by the single or synthetic microbial community (Syncom) treatment in an outdoor red pepper field, it was confirmed that the resistance against disease in the synthetic microbial phase increased (FIG. 9).

Figure 10:
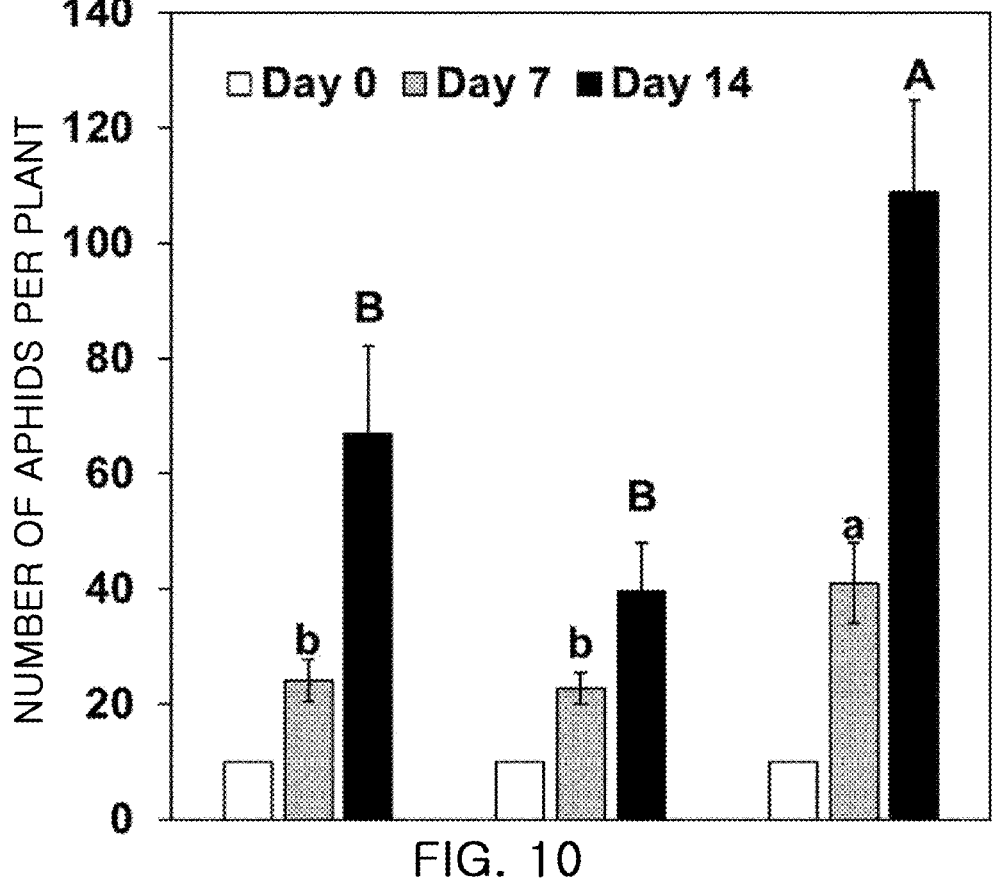
FIG. 10 is a diagram illustrating the elicitation of systemic resistance against aphids on pepper by the synthetic microbial community (Syncom) treatment.

Example 9: Aphid Control of Pepper Leaf in the Greenhouse Through Synthetic Microbial Community (Syncom) Soil Treatment As can be seen in FIG. 10 below, it was confirmed that the soil treatment of the synthetic microbial phase increased the aphid control effect of pepper in the greenhouse.

Hereinabove, the present disclosure has been described with reference to exemplary embodiments. It will be understood by those skilled in the art to which the present disclosure pertains that the present disclosure may be implemented in a modified form without departing from essential characteristics of the present disclosure. Therefore, exemplary embodiments disclosed herein should be considered in an illustrative aspect rather than a restrictive aspect. The scope of the present disclosure should be defined by the claims rather than the above-mentioned description, and equivalents to the claims should be interpreted to fall within the present disclosure.

REFERENCE TO A "SEQUENCE LISTING"
SUBMITTED AS AN XML FILE

The material in the XML file, named "CSPL-67845-Sequence-Listing.xml", created Mar. 8, 2023, file size of 4,096 bytes, is hereby incorporated by reference.

The invention claimed is:

1. A composition for controlling plant disease and insect, comprising: a mixture of strains comprising *Brevibacterium frigoritolerans* HRS1 (KCTC 14301BP), *Bacillus niacini* HRS2 (KCTC 14302BP), and *Bacillus luciferensis* (HRS4, KCTC 14304BP).

2. The composition of claim 1, wherein the mixture of strains further comprising *Solibacillus silvestris* HRS3 (KCTC 14303BP).

3. The composition of claim 1, wherein the plant disease is caused by a plant pathogen comprising one or more of *Ralstonia solanacearum* or *Xanthomonas axonopodis* pv. *vesicatoria* (Xav).

4. The composition of claim 1, wherein the plant disease is one or more of bacterial wilt or spot disease.

5. The composition of claim 1, wherein the insect is an aphid.

6. A method for controlling plant disease and insect comprising applying the composition of claim 1 to a plant or around the plant.

7. The method of claim 6, wherein, in the applying, the composition is applied on soil, roots, seeds, sprayed onto plants, or applied by a combination thereof.

8. The method of claim 6, wherein the plant is tomato or pepper.

* * * * *